M. LEITCH.
SOLDERING MACHINE FOR SOLDERING THE END SEAMS OF ROUND CANS.
APPLICATION FILED AUG. 21, 1905.
1,002,284.
Patented Sept. 5, 1911.
5 SHEETS—SHEET 1.
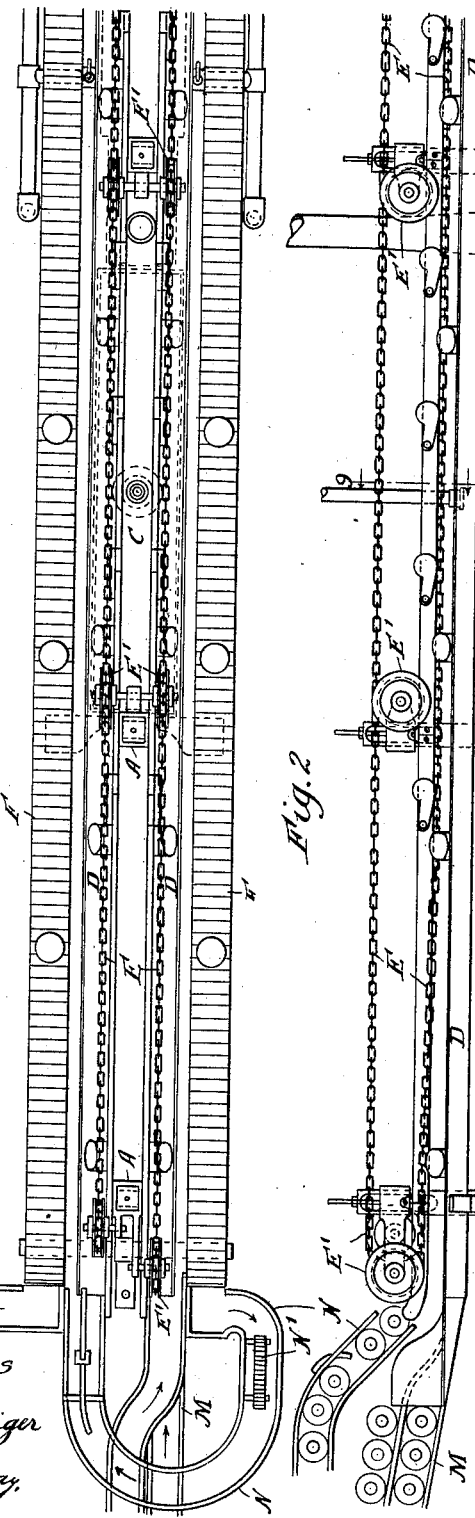
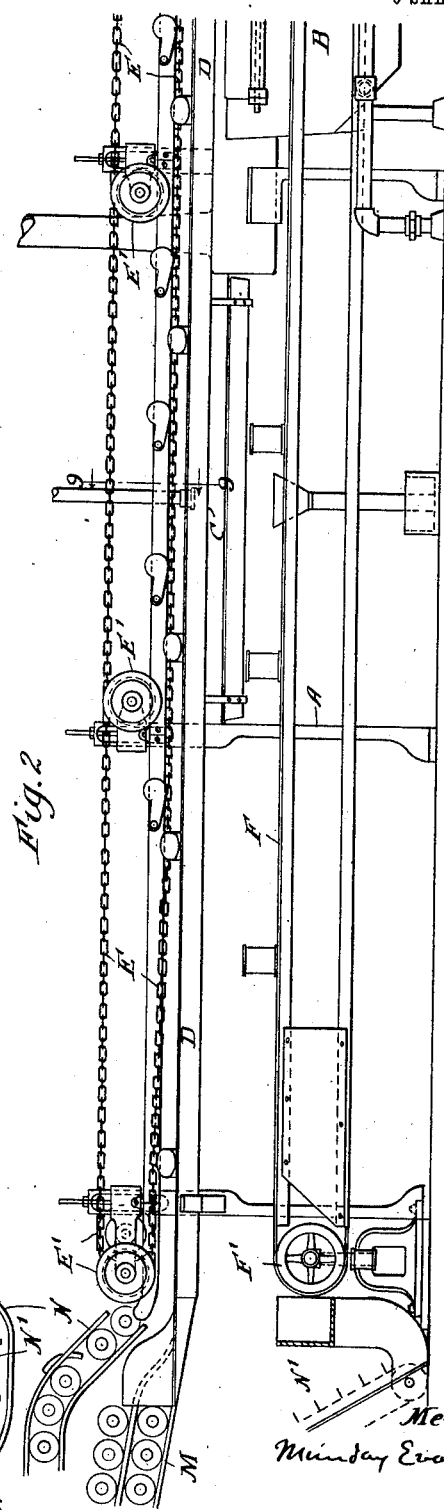
Witnesses
Wm Geiger
W. R. Munday
Inventor:
Meredith Leitch
Munday, Evarts & Adcock
Attorneys

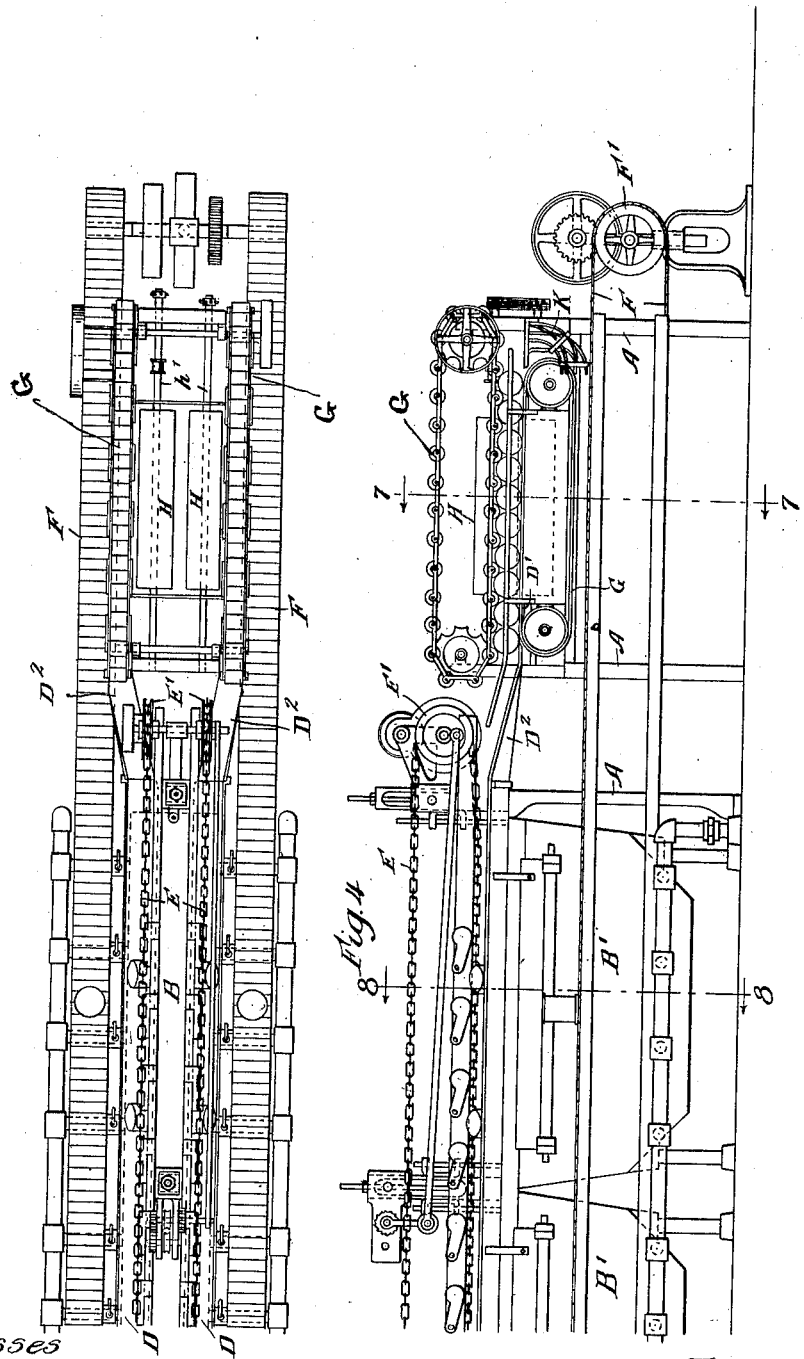

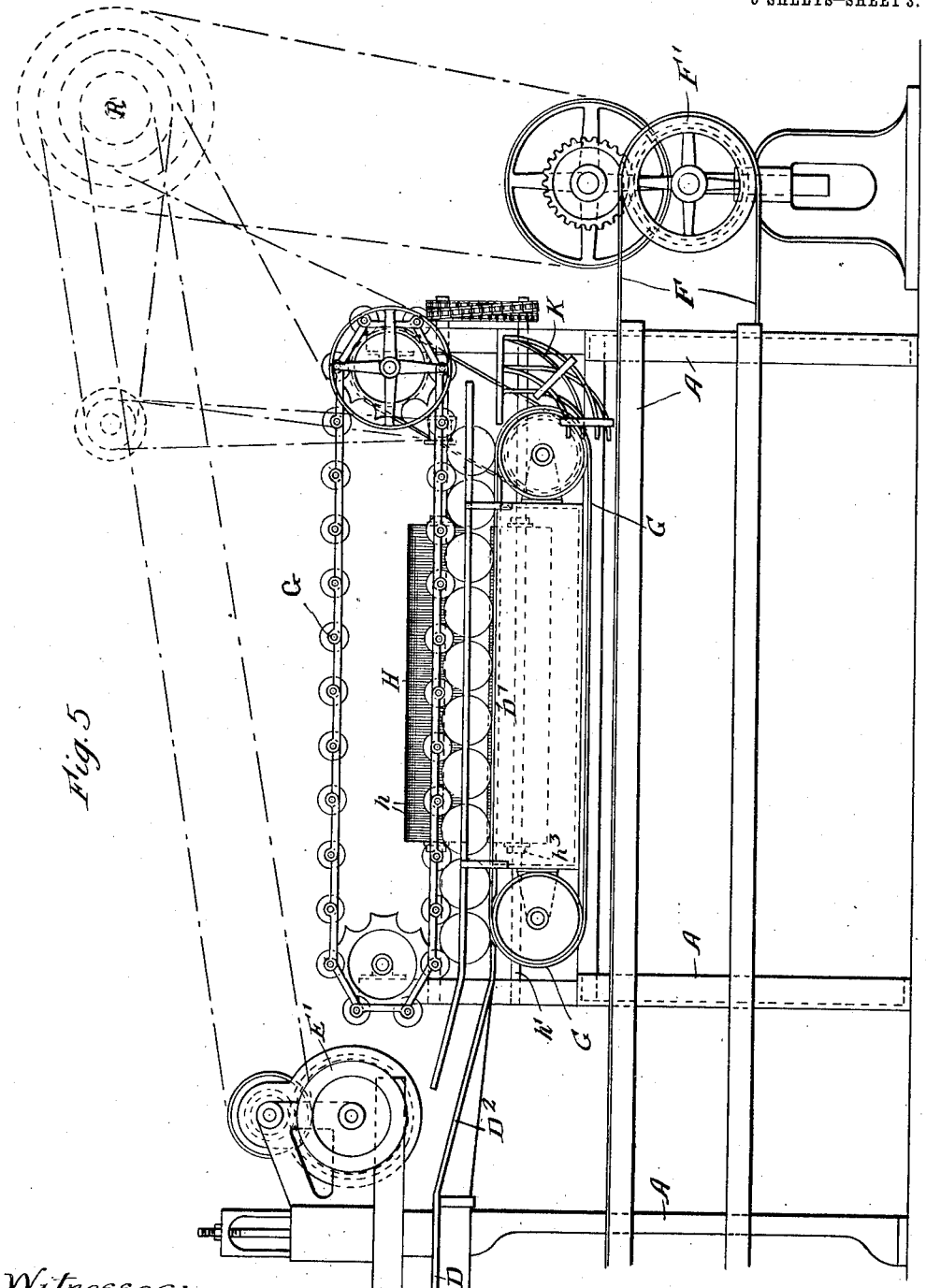

M. LEITCH.
SOLDERING MACHINE FOR SOLDERING THE END SEAMS OF ROUND CANS.
APPLICATION FILED AUG. 21, 1905.
1,002,284.
Patented Sept. 5, 1911.
5 SHEETS—SHEET 4.
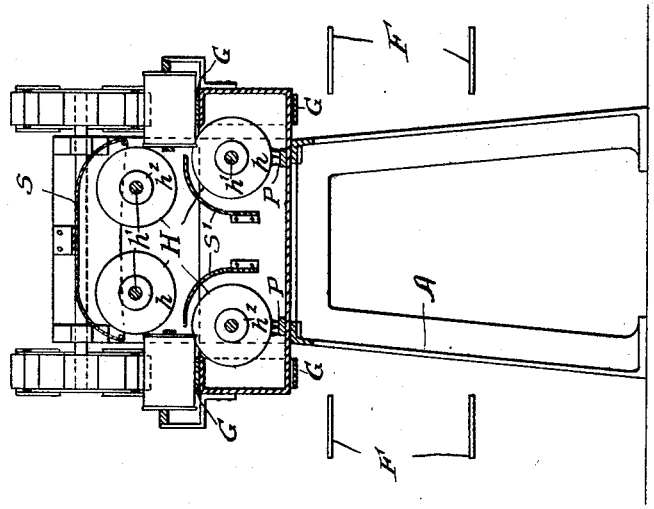
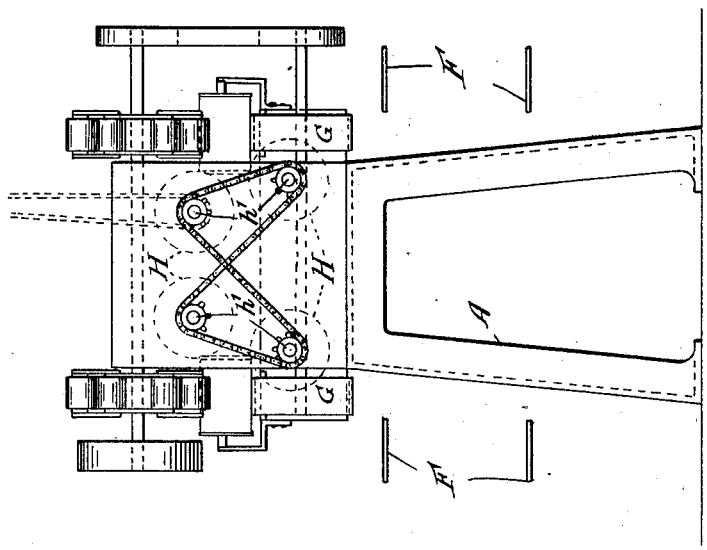
Witnesses:
Wm Geiger
A. W. Munday
Inventor:
Meredith Leitch
By Munday, Evarts & Adcock
Attorneys M. LEITCH.
SOLDERING MACHINE FOR SOLDERING THE END SEAMS OF ROUND CANS.
APPLICATION FILED AUG. 21, 1905.
1,002,284.
Patented Sept. 5, 1911.
5 SHEETS—SHEET 5.
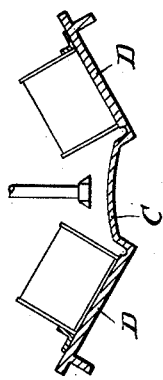
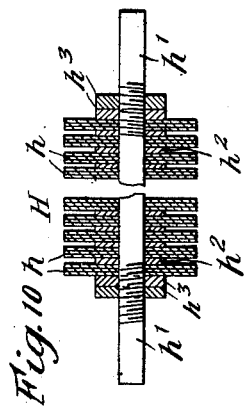
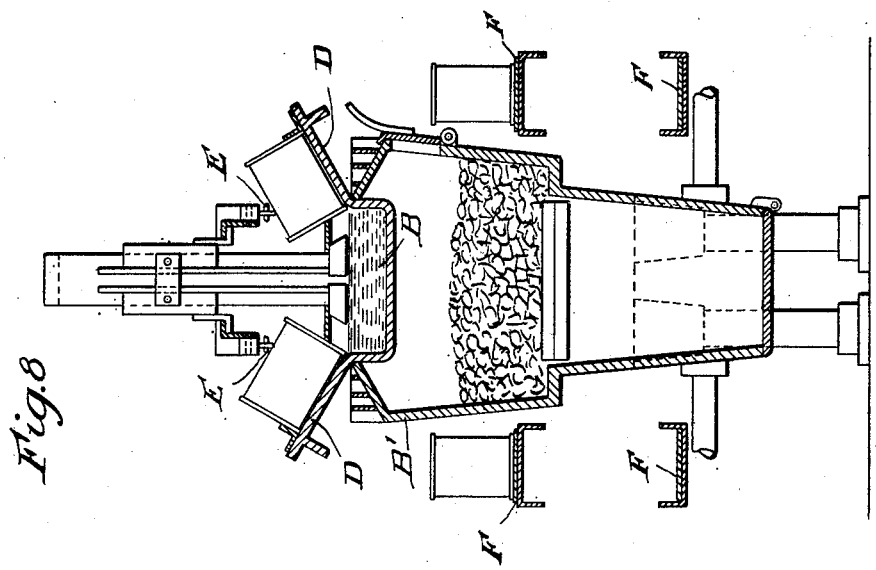
Witnesses:
Inventor:
Meredith Leitch

UNITED STATES PATENT OFFICE.

MEREDITH LEITCH, OF NEW YORK, N. Y., ASSIGNOR TO AMERICAN CAN COMPANY, OF NEW YORK, N. Y., A CORPORATION OF NEW JERSEY.

SOLDERING-MACHINE FOR SOLDERING THE END SEAMS OF ROUND CANS.

1,002,284.      Specification of Letters Patent.      Patented Sept. 5, 1911.

Application filed August 21, 1905. Serial No. 274,983.

*To all whom it may concern:*

Be it known that I, MEREDITH LEITCH, a citizen of the United States, residing in New York, in the county of New York and State of New York, have invented a new and useful Improvement in Soldering-Machines for Soldering the End Seams of Round Cans, of which the following is a specification.

My invention relates to improvements in soldering machines for soldering the end seams of round cans by rolling the cans along a transversely inclined runway over a flux applying bath or device and over a molten solder bath, and more particularly to means for removing surplus solder from the outside corner surface of the cans which has come in contact with the molten solder of the solder bath in the soldering operation.

Can end soldering machines of the kind or class to which my invention relates, as heretofore in use, operate to solder the cans very perfectly and securely and also very rapidly and cheaply so far as labor cost is concerned, as the cans are simply rolled along the transversely inclined runway by an endless chain or conveyer which rests upon the rolling cans, but the soldering has heretofore been done with a considerable waste of solder owing to the unnecessary coating of solder on the outside corner surface of the cans. And it has heretofore been attempted to remove this unnecessary coating of solder, which also disfigures the appearance of the cans, by a wiping or brushing operation to which the cans are subjected while the solder is yet in a molten condition; but in practice it is found that this solder coating cannot be perfectly and cleanly removed by a wiping or brushing action, and the pressure of the brush or wiper against the members of the seam to be united by the solder while the solder is yet unset or in a molten condition is also liable to slightly move or separate the parts of the seam while the solder is changing from the liquid to the solid state, and when the slightest pressure, jar or disturbance of the members of the seam is likely to produce pin holes or leaks or defects in the soldered seam.

It is the object of my invention to provide a can end soldering machine in which the end seams of round cans may be soldered very rapidly and cheaply by simply rolling them along a transversely inclined runway over a flux bath or flux applying device and over a solder bath, in which the soldered joints may be formed perfectly and with certainty in respect to strength, security and hermetic tightness, and by means of which at the same time the surplus, unnecessary, and disfiguring solder coating upon the outside corner surface of the can which has come in contact with the molten solder may be completely, perfectly and cleanly removed, and the original bright tin luster of the tin plate restored to its former appearance at this part of the can, and by which this result may be accomplished without diminishing or reducing the capacity of the soldering machine on the one hand or interfering in any way with the perfection of the soldered joints on the other.

The machine embodying my invention, and by which this result is accomplished, comprises in coöperative combination a fluxing bath or device, a molten solder bath, a furnace or heater for keeping the solder molten, two transversely inclined can runways extending over the flux bath or vessel and the molten solder bath or vessel, the runways being oppositely inclined and the cans rolling along one runway for soldering the seam at one end of the can and along the other for soldering the seam at the other end of the can, endless chains or conveyers for rolling the cans along the soldering runways, endless cooling conveyers traveling on horizontal pulleys for holding and conveying the cans in an upright position with their end seams horizontal while the solder in the joint is cooling or setting, rapidly rotating long, soft cylindrical buffers, composed each of circular cloth disks strung on a shaft, arranged parallel to the can runways and adapted to engage the corners or freshly soldered end seams of the cans as they are rolled along the runways after the rolling cans leave the solder bath and before the solder coating becomes set, and interposed in the path of the rolling cans between the solder bath and the cooling conveyers, and means for turning and delivering the cans from their rolling position on the runways into an upright position onto the cooling conveyers.

My invention also consists in the novel construction of parts and devices and in the novel combinations of parts and devices herein shown and described.

In the accompanying drawing, forming a part of this specification, Figure 1 is a plan view and Fig. 2 a side elevation, showing one end of a can end soldering machine embodying my invention. Fig. 3 is a plan view and Fig. 4 a side elevation showing the other end or portion of the machine. Fig. 5 is an enlarged detail elevation, showing the rotary cylindrical buffing mechanism. Fig. 6 is an end view of the buffer mechanism. Figs. 7 and 8 are cross sections on the line 7—7 and 8—8, respectively, of Fig. 4. Fig. 9 is a cross section on line 9—9 of Fig. 2, and Fig. 10 is a detail sectional view showing a portion of one of the rotary cylindrical buffers.

In the drawing A is the frame of the machine, B the molten solder bath or vessel for containing the molten solder, B¹ a furnace or heater, C the flux bath or vessel for containing the fluxing material, D D the transversely inclined can runways along which the cans are rolled first over the fluxing device to flux the seams of the cans and then over the molten solder bath or vessel to solder the seams. The cans are rolled along these runways by endless chains or conveyers traveling on horizontal pulleys or sprocket wheels E¹.

F F are the cooling belts or conveyers traveling on horizontal pulleys F¹, one of these conveyers being on each side of the machine and each being arranged below the can runway. The transversely inclined can runways D D are furnished with extensions D¹ along which the cans roll while being operated upon by the longitudinally arranged long cylindrical buffers. Each of the can runways D D has an inclined portion D² connecting its extension with the main portion of the runway and serving to facilitate the rolling of the cans along the runway after the cans leave the grip of the endless chain E, and before they are engaged by the endless belt or conveyer G by which the cans are rolled along the extension D¹ of the runway and in engagement with the long cylindrical buffers H which are arranged parallel to the runways, two buffers being employed for each runway, one to engage the cylindrical surface of the can corner or seam, and the other the flat or disk surface of the can corner or seam.

K K are curved or twisted guide-ways for turning and delivering the cans from their rolling position on the runways into an upright position on the cooling belts or conveyers F F.

Each of the long, soft cylindrical buffers H is composed of a series of circular flexible textile disks $h$ strung upon the buffer shaft $h^1$ and clamped together with interposed disks $h^2$ of smaller diameter by nuts $h^3$ on the buffer shaft. The buffers are preferably about six inches in diameter and from three to four feet in length and are rotated at a high or buffing speed, preferably about six hundred revolutions per minute. The cans are delivered to the runway D on one side of the machine by a delivery chute M, and after rolling along the runway over the flux bath and solder bath and in contact with the rotary buffers on this side of the machine, they are turned into an upright position and delivered onto the cooling conveyer and conveyed along it to the opposite end of the machine, during which time the solder in the soldered seam has had time to cool; and then the cans are turned end for end and delivered by the loop runway N and elevator N¹ to the runway D on the opposite side of the machine along which the cans roll while the other end seam of the can is being soldered, and the surplus solder removed by the other pair of rotary buffers on this other side of the machine. To keep the cloth disk buffers free from particles of solder, cleaner devices P are provided.

R is the driving shaft from which motion is communicated to the various moving parts of the machine by any suitable gearing or connecting mechanism, the same preferably consisting of belts and pulleys as illustrated in the drawing.

S S¹ are hoods or shields over the rotary buffers for collecting or deflecting the particles of solder thrown off from the rotary buffers by their rapid rotation.

I claim:—

1. In a can soldering machine, the combination with a can delivering runway, of a fluxing device, a solder bath, two transversely inclined can runways having guides at the upper edges thereof to engage the upper ends of cans rolling thereon, endless conveyers for rolling the cans along the runways, cooling conveyers below the can runways, two pairs of rapidly rotating soft, flexible, cylindrical buffers arranged parallel to and between the runways the buffers of each pair rotating in the same direction, one engaging the upper corner and one the lower corner of the rolling cans, and means for turning and delivering the cans from their rolling position on the runways into an upright position on the cooling conveyers, said runways having horizontal portions along which the cans roll while being engaged by said buffers, and a loop runway and an elevator for turning the cans end for end and delivering them from the cooling conveyer on one side of the machine to the can runway on the opposite side of the machine, said conveyer for rolling the cans along the runway adjacent to said buffers having a series of can spacing rollers, substantially as specified.

2. In a can end soldering machine, the combination with two transversely inclined can runways having guides at the upper edges thereof to engage the upper ends of cans rolling thereon, a fluxing device and a molten solder bath arranged along said runways, means for rolling the cans along the runways over the fluxing device and solder bath, two pairs of rapidly revolving, soft, long, cylindrical buffers spaced apart between the runways composed each of circular, flexible cloth disks strung upon shafts the buffers of each pair rotating in the same direction, one engaging the upper corner and one the lower corner of the rolling cans, two cooling conveyers arranged below the runways, two curved and twisted guide-ways for turning and delivering the cans from the can runways onto the cooling conveyers in an upright position, said runways having horizontal portions along which the cans roll while being engaged by said buffers, a loop runway for turning the cans end for end after being soldered at one end and delivering the cans onto the runway on the other side of the machine, said loop runway having an elevator, said conveyer for rolling the cans along the runway adjacent to said buffers having a series of can spacing rollers, substantially as specified.

3. A soldering machine for soldering the end seams of round cans comprising in combination, a transversely inclined can runway having a guide at the upper edge thereof to engage the upper ends of cans rolling thereon, a solder bath, a rotating buffer parallel to and below said runway and tangentially engaging the solder coated outside surface of the cans before the solder thereon sets or hardens, said runway having a horizontal portion adjacent to said buffer and a cooling conveyer below the soldering runway for holding and conveying the cans in an upright position with the freshly soldered seam horizontal while the solder sets, said conveyer for rolling the cans along the runway adjacent to said buffers having a series of can spacing rollers, substantially as specified.

4. A soldering machine for soldering the end seams of round cans comprising in combination, a transversely inclined can runway having a guide at the upper edge thereof to engage the upper ends of cans rolling thereon, a solder bath, a rotating buffer parallel to and below said runway and tangentially engaging the solder coated outside surface of the cans before the solder thereon sets or hardens, said runway having a horizontal portion adjacent to said buffer, and a cooling conveyer below the soldering runway for holding and conveying the cans in an upright position with the freshly soldered seam horizontal while the solder sets, and means for turning the cans from their inclined rolling position on the runway into an upright position and delivering them onto the cooling conveyer, said conveyer for rolling the cans along the runway adjacent to said buffers having a series of can spacing rollers, substantially as specified.

5. A soldering machine for soldering the end seams of round cans comprising in combination, a transversely inclined can runway having a guide at the upper edge thereof to engage the upper ends of cans rolling thereon, a solder bath, a rotating buffer parallel to and below said runway and tangentially engaging the solder coated outside surface of the cans before the solder thereon hardens, said runway having a horizontal portion adjacent to said buffer, and a cooling conveyer below the soldering runway for holding and conveying the cans in an upright position with the freshly soldered seam horizontal while the solder sets, and a curved and twisted guideway for turning the cans from their rolling position on the runway to an upright position, and delivering them onto the cooling conveyer, said conveyer for rolling the cans along the runway adjacent to said buffers having a series of can spacing rollers, substantially as specified.

6. In a machine for soldering the end seams of round cans, the combination with a molten solder bath, of a can runway having a guide at the upper edge thereof to engage the upper ends of cans rolling thereon, means for rolling the cans along the runway, a can cooling conveyer for conveying the freshly soldered cans in an upright position with the freshly soldered seam horizontal while the solder is setting, and a long, cylindrical rapidly revolving buffer parallel to and below the can runway and interposed along the path of the rolling cans between the solder bath and said can cooling conveyer, said buffer tangentially engaging the solder coated outside surface of the cans as they roll along the runway, said runway having a horizontal portion adjacent to said buffer, said conveyer for rolling the cans along the runway adjacent to said buffers having a series of can spacing rollers, substantially as specified.

7. In a machine for soldering the end seams of round cans, the combination with a molten solder bath, of a can runway having a guide at the upper edge thereof to engage the upper ends of cans rolling thereon, means for rolling the cans along the runway, a can cooling conveyer for conveying the freshly soldered cans in an upright position with the freshly soldered seam horizontal while the solder is setting, and a long, cylindrical rapidly revolving buffer parallel to and below the can runway and interposed along the path of the rolling cans between the solder bath and said can cooling conveyer, said buffer tangentially engaging the solder coated outside surface of the cans as they roll along the runway, said runway having a horizontal portion adjacent to said buffer, and means for turning the cans from their rolling position on the runway and delivering them onto the cooling conveyer in an upright position, said conveyer for rolling the cans along the runway adjacent to said buffers having a series of can spacing rollers, substantially as specified.

8. In a machine for soldering the end seams of round cans, the combination with two transversely inclined can runways having guides at the upper edges thereof to engage the upper ends of cans rolling thereon, means for rolling the cans along said runways, means for applying the molten solder to the end seams of the cans as they roll along the runways and rapidly rotating cylindrical buffers parallel to and between the can runways and tangentially engaging the solder coated outside corner surface of the cans before the solder thereon sets or hardens, said runways having horizontal portions along which the cans roll while being engaged by said buffers, two can cooling conveyers arranged below the can runways for holding and conveying the cans in an upright position while the solder sets after being acted upon by said buffers, said conveyer for rolling the cans along the runway adjacent to said buffers having a series of can spacing rollers, substantially as specified.

9. In a machine for soldering the end seams of round cans, the combination with two transversely inclined can runways having guides at the upper edges thereof to engage the upper ends of cans rolling thereon, means for rolling the cans along said runways, means for applying molten solder to the end seams of the cans as they roll along the runways, and rapidly rotating cylindrical buffers parallel to and between the can runways and tangentially engaging the solder coated outside corner surface of the cans before the solder thereon sets or hardens, said runway having a horizontal portion adjacent to said buffer, two can cooling conveyers arranged below the can runways for holding and conveying the cans in an upright position while the solder sets after being acted upon by said buffers, and means for turning the cans from their rolling position on the runways into an upright position on the cooling conveyers, said conveyer for rolling the cans along the runway adjacent to said buffers having a series of can spacing rollers, substantially as specified.

10. In a machine for soldering the end seams of round cans, the combination with two transversely inclined can runways having guides at the upper edges thereof to engage the upper ends of cans rolling thereon, means for rolling the cans along said runways, means for applying molten solder to the end seams of the cans as they roll along the runways and rapidly rotating cylindrical buffers parallel to and between the can runways and tangentially engaging the solder coated outside corner surface of the cans before the solder thereon sets or hardens, said runway having a horizontal portion adjacent to said buffer, two can cooling conveyers arranged below the can runways for holding and conveying the cans in an upright position while the solder sets after being acted upon by said buffers, and a loop runway and elevator for turning the cans end for end and delivering them from the cooling conveyer on one side of the machine to the runway on the other side of the machine, said conveyer for rolling the cans along the runway adjacent to said buffers having a series of can spacing rollers, substantially as specified.

11. In a machine for soldering the end seams of round cans, the combination with two transversely inclined can runways having guides at the upper edges thereof to engage the upper ends of cans rolling thereon, means for rolling the cans along said runways, means for applying molten solder to the end seams of the cans as they roll along the runways and rapidly rotating cylindrical buffers parallel to and between the can runways and tangentially engaging the solder coated outside corner surface of the cans before the solder thereon sets or hardens, said runway having a horizontal portion adjacent to said buffer, two can cooling conveyers arranged below the can runways for holding and conveying the cans in an upright position while the solder sets after being acted upon by said buffers, and means for turning the cans from their rolling position on the runways into an upright position on the cooling conveyers, and a loop runway and elevator for turning the cans end for end and delivering them from the cooling conveyer on one side of the machine to the runway on the other side of the machine, said conveyer for rolling the cans along the runway adjacent to said buffers having a series of can spacing rollers, substantially as specified.

12. In a machine for soldering the end seams of round cans, the combination with a solder bath, a can runway having a guide at the upper edge thereof to engage the upper ends of cans rolling thereon, means for rolling the cans along the runway, and a rapidly rotating soft cylindrical buffer parallel to and below the runway and composed of circular textile disks strung and clamped together on the buffer shaft, said buffer tangentially engaging the solder coated outside surface of the cans as they roll along the runway, said runway having a horizontal portion adjacent to said buffer, said conveyer for rolling the cans along the runway adjacent to said buffers having a series of can spacing rollers, substantially as specified.

13. In a machine for soldering the end seams of round cans, the combination with a solder bath, a can runway having a guide at the upper edge thereof to engage the upper ends of cans rolling thereon, means for rolling the cans along the runway, and a rapidly rotating soft cylindrical buffer parallel to and below the runway and composed of circular textile disks strung and clamped together on the buffer shaft said runway having a horizontal portion adjacent to said buffer, said buffer tangentially engaging the solder coated outside surface of the cans as they roll along the runway and a cooling conveyer below the runway, said conveyer for rolling the cans along the runway adjacent to said buffers having a series of can spacing rollers, substantially as specified.

14. In a machine for soldering the end seams of round cans, the combination with a solder bath, a can runway having a guide at the upper edge thereof to engage the upper ends of cans rolling thereon, means for rolling the cans along the runway, and a rapidly rotating soft cylindrical buffer parallel to and below the runway and composed of circular textile disks strung and clamped together on the buffer shaft said buffer tangentially engaging the solder coated outside surface of the cans as they roll along the runway, said runway having a horizontal portion adjacent to said buffer, and a cooling conveyer below the runway, and means for turning the cans from their rolling position on the runway into an upright position and delivering them onto the cooling conveyer, said conveyer for rolling the cans along the runway adjacent to said buffers having a series of can spacing rollers, substantially as specified.

MEREDITH LEITCH.

Witnesses:
W<small>M</small>. C. B<small>RANDT</small>,
M<small>AY</small> B<small>ENNETT</small>.

---

Copies of this patent may be obtained for five cents each, by addressing the "Commissioner of Patents, Washington, D. C."